(12) United States Patent
Mohalik et al.

(10) Patent No.: US 11,595,784 B2
(45) Date of Patent: Feb. 28, 2023

(54) MONITORING OBJECTS CAPABLE OF WIRELESS COMMUNICATIONS

(71) Applicant: Telefonaktiebolaget LM Ericsson (publ), Stockholm (SE)

(72) Inventors: Swarup Kumar Mohalik, Bangalore (IN); Mahesh Babu Jayaraman, Bangalore (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/310,872

(22) PCT Filed: Jun. 20, 2016

(86) PCT No.: PCT/IN2016/050190
§ 371 (c)(1),
(2) Date: Dec. 18, 2018

(87) PCT Pub. No.: WO2017/221260
PCT Pub. Date: Dec. 28, 2017

(65) Prior Publication Data
US 2020/0314233 A1    Oct. 1, 2020

(51) Int. Cl.
*H04W 4/029*    (2018.01)
*H04W 4/80*    (2018.01)
(Continued)

(52) U.S. Cl.
CPC ....... *H04W 4/029* (2018.02); *H04M 1/72454* (2021.01); *H04W 4/023* (2013.01);
(Continued)

(58) Field of Classification Search
CPC ... H04M 1/72569; H04W 4/80; H04W 4/023; H04W 8/005
See application file for complete search history.

(56) References Cited

U.S. PATENT DOCUMENTS 7,880,613 B1 *  2/2011  Maeng ............... G08B 21/0275
                                                340/568.1
9,297,882 B1 *  3/2016  Bhatia .................. H04W 4/029
(Continued)

FOREIGN PATENT DOCUMENTS

CN    101071468 A    11/2007
CN    104615766 A    5/2015

OTHER PUBLICATIONS

International Search Report and Written Opinion of the International Searching Authority, PCT/IN2016/050190, dated Oct. 23, 2017, 8 pages.
(Continued)

*Primary Examiner* — Lester G Kincaid
*Assistant Examiner* — Maryam Soltanzadeh
(74) *Attorney, Agent, or Firm* — Sage Patent Group

(57) ABSTRACT

A method of monitoring objects capable of wireless communications is provided. The method comprises detecting an activity performed by a user of a wireless communications device, acquiring information identifying an expected set of objects which are associated with the detected activity, determining whether at least one of the objects in the expected set is not in proximity of the wireless communications device, and if so notifying the user that at least one of the objects in the expected set is not in proximity of the wireless communications device.

24 Claims, 10 Drawing Sheets

(51) Int. Cl.
  *H04W 4/02*      (2018.01)
  *H04W 8/00*      (2009.01)
  *H04M 1/72454*   (2021.01)
  *H04W 12/64*     (2021.01)

(52) U.S. Cl.
  CPC ............ *H04W 4/80* (2018.02); *H04W 8/005* (2013.01); *H04W 12/64* (2021.01)

(56) References Cited

U.S. PATENT DOCUMENTS

| | | | |
|---|---|---|---|
| 9,351,122 | B1 | 5/2016 | Daniel et al. |
| 2014/0145845 | A1 | 5/2014 | Sattari |
| 2015/0382160 | A1* | 12/2015 | Slay, Jr. .............. H04W 4/029 455/466 |
| 2016/0048283 | A1* | 2/2016 | Yang .................. G06F 3/0485 715/784 |
| 2016/0117899 | A1 | 4/2016 | Chevalier et al. |
| 2016/0174025 | A1* | 6/2016 | Chaudhri .............. H04B 1/385 455/41.1 |
| 2016/0174035 | A1 | 6/2016 | Hughes et al. |
| 2017/0084151 | A1* | 3/2017 | Beaty ................ G08B 21/0227 |

OTHER PUBLICATIONS

Extended European Search Report for European patent application No. EP 16 90 6200, dated Feb. 28, 2019, 10 Pages.
Office Action dated Jan. 6, 2021 for Chinese Patent Application No. 201680086863.2, 4 pages.
English Translation of Chinese First Office Action for Chinese application No. 201680086863.2 dated May 14, 2020, 2 pages.
Extended European Search Report dated Dec. 20, 2022 for European Patent Application No. 22206968.4, 8 pages.

* cited by examiner

MONITORING OBJECTS CAPABLE OF WIRELESS COMMUNICATIONS

CROSS REFERENCE TO RELATED APPLICATIONS

This application is a 35 U.S.C. § 371 national stage application of PCT International Application No. PCT/IN2016/050190 filed on Jun. 20, 2016 the disclosure and content of which is incorporated by reference herein in its entirety.

TECHNICAL FIELD

The invention relates to a method of monitoring objects capable of wireless communications, a device for monitoring objects capable of wireless communications, a corresponding computer program, and a corresponding computer program product.

BACKGROUND

In the art, there are methods available to detect proximity of devices based on technologies like Near-Field Communication (NFC), e.g., Radio-Frequency Identification (RFID), Bluetooth, 6LOWPAN ("IPv6 over Low Power Wireless Personal Area Networks"), and the like.

These technologies may be used for resolving issues relating to anti-theft, child security, providing reminders, and the like. Typically, the user has to configure a tracker application/device and the device(s) to be tracked, after which the tracker issues alarms if the tracked device(s) is/are not in proximity of the tracker, i.e., is/are outside a predetermined range from the tracker. For instance, a child may be provided with a tracked device in the form of a small radio transmitter, and the tracker device will sound an alarm if the child moves outside of a pre-defined area.

However, these prior art methods are inadequate when the set of devices in the proximity of the individual changes dynamically depending upon the environment and activities performed by the individual. The problem is being further aggravated due to the rapid increase of Internet-of-Things (IoT) devices like sensors, wearables, mobile phones, etc.

SUMMARY

An object of the present invention is to solve, or at least mitigate, this problem in the art and to provide an improved method of monitoring objects capable of wireless communications. This object is attained in a first aspect of the invention by a method of monitoring objects capable of wireless communications. The method comprises detecting an activity performed by a user of a wireless communications device, acquiring information identifying an expected set of objects which are associated with the detected activity, determining whether at least one of the objects in the expected set is not in proximity of the wireless communications device, and if so notifying the user that at least one of the objects in the expected set is not in proximity of the wireless communications device.

This object is attained in a second aspect of the invention by a device for monitoring objects capable of wireless communications, the device comprising a processing unit and a memory. The memory contains instructions executable by the processing unit, whereby the device is operative to detect an activity performed by a user of a wireless communications device, acquire information identifying an expected set of objects which are associated with the detected activity, determine whether at least one of the objects in the expected set is not in proximity of the wireless communications device, and if so to notify the user that at least one of the objects in the expected set is not in proximity of the wireless communications device.

Hence, a device referred to as a tracker device, being for instance a mobile phone, a mobile terminal, a User Equipment (UE), or a smartphone of a user, detects that a certain activity is performed by the user. For instance, it may be detected that the user performs an activity such as "Go To Work" upon leaving her home premises during a time window specified for the activity ("Any Weekday, 07:00-08:00").

To this end, a change in location of the user may, e.g., be detected using a Global Positioning System (GPS) of the tracker device (from a first location "on home premises" to a second location "off home premises", or "leaving home premises").

Thereafter, information is acquired identifying an expected set of objects which are associated with the detected activity, such as a wallet, a home key and a work pass.

It is noted that the objects are required to be equipped with wireless communications capability such as Near Field Communication (NFC) technology in the form of, e.g., a Radio-Frequency Identification (RFID) tag, a Bluetooth transmitter, or any other short-range radio transmitter, for communicating with the tracker device.

If it is determined that any one or more of the objects included in the expected set, e.g., the wallet, is not in proximity to the tracker device when the tracker device leaves the home premises of the user during the time window specified for the activity, as detected by means of, e.g., NFC-based communications between the tracker device and the objects, the user is notified accordingly.

Hence, if it is concluded that one or more of the objects in the expected set is not in proximity of the tracker device upon the user performing the activity (i.e., one or more of the objects are outside a proximity range of the tracker device), in this case leaving the home premises on a weekday between 7 and 8 AM, the user is advantageously notified accordingly. The user is thus made aware that she forgot one or more of the objects of the expected set associated with this particular activity and can go back into her house to pick up any forgotten object of the expected set before leaving for work.

In an embodiment, the user is notified by the tracker device emitting an audible sound, displaying a message, generating a haptic notification such as a vibration, etc. In an alternative embodiment, the tracker device may signal another wireless communications device that the user should be notified, for instance by requesting the user's smartwatch to vibrate, or requesting the user's car to not start the engine and/or display a message on the dashboard.

The method of monitoring the objects may be performed by the tracker device, a node of a communications network which is accessible by the wireless communications device, e.g., an application server, or one or more nodes of a cloud environment which is accessible by the wireless communications device. It is envisaged that a distributed solution may be provided, wherein the tracker device performs one or more steps of the method, while one or more cloud devices performs any further steps.

In a further embodiment, an actual set of objects which are in proximity of the wireless communications device is determined, and it is further determined whether at least one of the objects in the expected set is not in the actual set. If so, the user is notified accordingly.

In still a further embodiment, after or prior to notifying the user that one or more of the objects included in the expected set has not been detected as being in proximity to the tracker device, the user is queried as to whether any objects of the determined actual set are to be added to the expected set associated with the detected activity. If so, an updated expected set may be stored in a database comprising activities and corresponding expected sets of objects.

In yet another embodiment, after the user has been notified that one or more of the objects included in the expected set have not been detected as being in proximity to the tracker device, the user is queried as to whether one or more objects of the expected set associated with the detected activity are to be removed from the expected set to create an updated expected set for the detected activity. If so, an updated expected set may be stored in a database comprising activities and corresponding expected sets of objects.

In another embodiment, the activity which is performed by the user of the wireless communications device is detected based on at least one of, a combination, or a pattern, of: a location of the wireless communications device or a change thereof, a motion pattern of the wireless communications device or a change thereof, a date, a time of day, a calendar event, a communication event, sensor readings, and current weather conditions.

In still a further embodiment, a behaviour of the user is registered, and if it is concluded that the registered behaviour is a frequently occurring behaviour of the user, the registered behaviour is specified as an activity.

In still another embodiment, a group of objects are registered as being carried by the user when the frequently occurring behaviour of the user is registered, the group of objects being specified as the expected set of objects associated with the specified activity.

Further provided is a computer program comprising computer-executable instructions for causing the device to perform steps according to an embodiment of the first aspect of the invention, when the computer-executable instructions are executed on a processing unit included in the device.

Further provided is a computer program product comprising a computer readable medium, the computer readable medium having an embodiment of the computer program embodied thereon.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
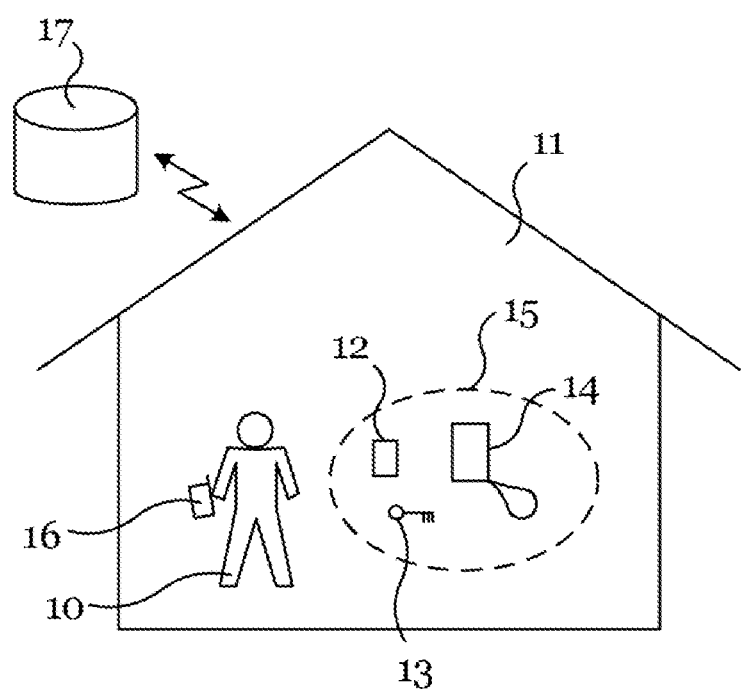
FIG. 1 illustrates a scenario where a user of a wireless communications device is monitored leaving the home premises for work, in accordance with embodiments of the invention.

FIG. 1 illustrates an exemplifying embodiment of the invention. Commonly, when an individual or user 10 leaves home 11 for work every morning, she will want to bring with her a set of objects that she will need during her work day, which set in this particular example is exemplified as comprising her wallet 12, home key 13, and work pass 14 to be used for entering work premises.

This set 15 of objects is referred to as the expected set of objects. That is, when the individual 10 with which the objects 12, 13, 14 are associated leaves home for work, she 10 is expected to carry the objects in the expected set 15 with her.

Individual 10 further carries a wireless communications device 16, in FIG. 1 exemplified as a smartphone 16. This wireless communications device 16 is referred to as a tracker device.

It is noted that the objects 12, 13, 14 are required to be equipped with wireless communications capability. Such capability is typically already present at the work pass 14 which oftentimes utilizes Near Field Communication (NFC) technology in the form of, e.g., Radio-Frequency Identification (RFID) for communicating with a corresponding reader at the work premises.

Any objects not normally being equipped with wireless communications means, such as the wallet 12 and the key 13, may be provided with wireless communications means such as an RFID tag, a Bluetooth or 6LoWPAN ("IPv6 over Low Power Wireless Personal Area Networks") transmitter, or the like.

To this end, the objects 12, 13, 14 included in the expected set 15 are capable of communicating wirelessly with the tracker device 16, in the form of a mobile phone, a smartphone, a mobile terminal, a UE, a tablet, a smartwatch, or any other appropriate wireless communications device, being equipped with a processing unit and a wireless communications interface. As discussed, the tracker device 16 may communicate with objects capable of wireless communications via any appropriate wireless technology, such as RFID, Bluetooth, 6LoWPAN, any cellular telecommunications technology (3G, 4G, 5G, etc), Wireless Local Area Network (WLAN)/WiFi, etc. It may further be envisaged that the tracker device 16 communicates with one or more remotely located network nodes, such as for instance an application server 17 or one or more nodes of a cloud environment which is/are accessible by the tracker device 16, for fetching stored data, for storing data, or for having the network node perform any computing functions on behalf of the tracker device 16.

Now, the expected set 15 of objects is associated with a particular activity in which the user 10 of the tracker device 16 is to partake, in this exemplifying embodiment an activity defined as "going to work". Hence, the following associations are made at the tracker device 16 and/or the server 17:

Expected_Set_of_Devices="Wallet, Key, Work Pass";

Expected_Set_of_Devices→Activity="Go to Work"

The activity can be specified in many different ways, e.g., as a time window set to "Any Weekday, 07:00-08:00". In this exemplifying embodiment, the activity may further specify a location criterion which is associated with the tracker device 16 used by the user 10.

Similar to the above specified activity, the location criterion comprised in the activity can be specified in numerous ways depending on the particular implementation, in this exemplifying embodiment for instance as "Leave Home". The tracker device 16 will accordingly detect indirectly whether at least one of the objects 12, 13, 14 in the expected set 15 complies with this predetermined location criterion by determining whether it complies with this predetermined location criterion itself.

Hence, the expected set 15 of objects may be associated with the specified activity as:

Expected_Set_of_Devices→Activity="Go to Work"= [Location="Leave Home" AND Day="Any Weekday" AND Time="07:00-08:00"]

It is envisaged that there are numerous options for specifying an activity in which the user 10 is to partake. Further examples will be given hereinbelow.

Figure 2:
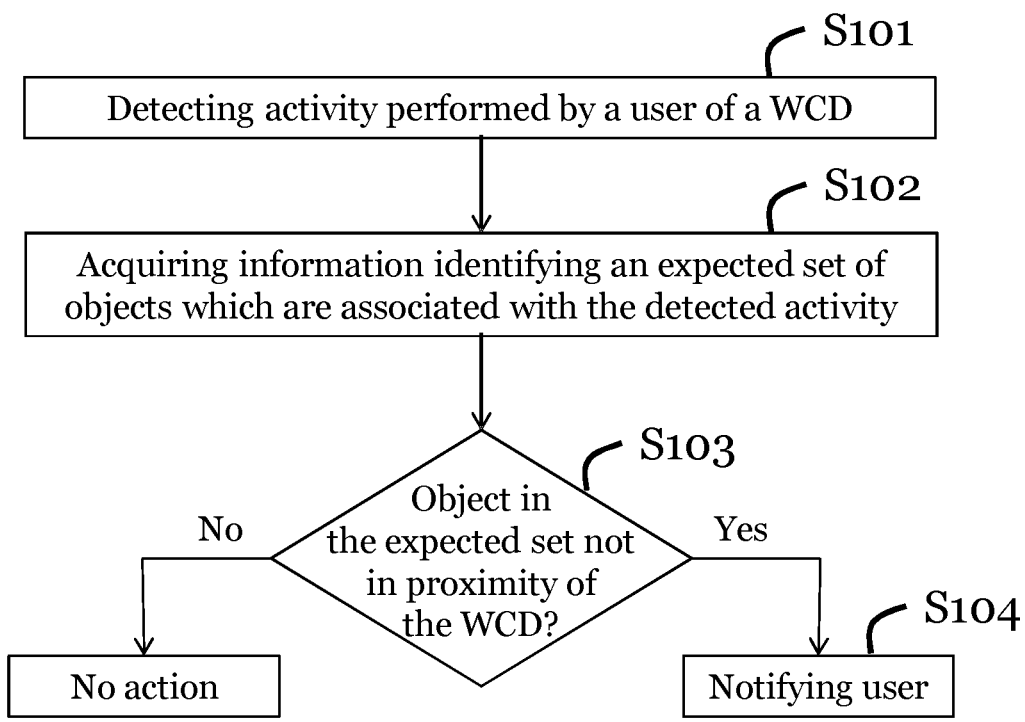
FIG. 2 shows a flowchart illustrating an embodiment of a method of monitoring objects capable of wireless communications.

Reference is further be made to the flowchart of FIG. 2 for describing an embodiment of a method of monitoring objects capable of wireless communications.

In a first step S101, it is detected that a specified activity is performed by the user 10. In this embodiment, the user 10 is considered to perform the activity upon leaving the home premises 11, which is detected by means of the tracker device 16 leaving the home premises 11 during the time window specified for the activity ("Any Weekday, 07:00-08:00"). Hence, a change in location is detected, by detection a change in location of the tracker device 16 from a first location ("on home premises") to a second location ("off home premises").

Thereafter, in step S102, information is acquired identifying an expected set 15 of objects which are associated with the detected activity, in this case the wallet 12, the home key 13, and the work pass 14. It can be envisaged that each object is given a unique numerical identifier.

If it is determined in step S103 that any one or more of the objects included in the expected set 15, e.g., the wallet 12, is not in proximity to the tracker device 16 when the tracker device leaves the home premises 11 of the user 10 during the time window specified for the activity, the user 10 is notified thereof in step S104. The respective locations of the objects 12, 13, 14 and the tracker device 16 may be tracked using, e.g., Global Positioning System (GPS). Alternatively, it is envisaged that the location or position of tracker device 16 is determined using GPS, while the proximity of the objects 12, 13, 14 to the tracker device is detected using, e.g., NFC or any other short-range radio technology between the tracker device 16 and the objects 12, 13, 14.

Hence, if it is concluded that one or more of the objects 12, 13, 14 in the expected set 15 are not in proximity of the tracker device 16 upon the user 10 performing the activity (i.e., one or more of the objects are outside a proximity range defined for the tracker device 16), in this case leaving the home premises 11 on a weekday between 7 and 8 AM, the user 10 is advantageously notified accordingly. The user 10 is thus made aware that she forgot one or more of the objects of the expected set 15 associated with this particular activity and can go back into her house 11 to pick up any forgotten object of the expected set 15 before leaving for work.

Typically, in case all the objects 12, 13, 14 in the expected set 15 are in proximity of the tracker device 16, the user 10 is not notified, even though it could be envisaged that the user 10 is notified that all objects of the expected set 15 have been successfully detected.

In an embodiment, the user 10 is notified by tracker device 16 emitting an audible sound, displaying a message, generating a haptic notification such as a vibration, etc. In an alternative embodiment, the tracker device 16 may signal another wireless communications device that the user 10 should be notified, for instance by requesting the user's smartwatch to vibrate, or requesting the user's car to not start the engine and/or display a message on the dashboard.

Now, in the above described embodiment, it may be envisaged that the tracker device 16 itself performs all steps S101-S104 for monitoring the objects. Hence, the tracker device 16 detects in step S101 that it is located outside of the home premises 11 (i.e., by detecting a change in its location from a first location to a second location as previously described) on a weekday at 07:00-08:00.

Thereafter, the tracker device 16 requests from a local data storage in step S102 information identifying the expected set 15 of objects which are associated with the detected activity, and determines whether it is capable of communicating, e.g., by NFC, with all the objects 12, 13, 14 in the expected set 15 in step S103.

Alternatively, the tracker device 16 may measure the strength of a signal submitted by the respective object, and if the signal strength is sufficient, i.e., exceeds a threshold value, the object is considered to be in proximity of the tracker device 16.

If so, all the objects 12, 13, 14 of the expected set 15 are in proximity to the tracker device 16. If not, the tracker device 16 notifies the user, and the user 10 is thus advantageously made aware that she forgot one or more of the objects of the expected set 15 associated with this particular activity and can go back into her house 11 to pick up any forgotten object of the expected set 15 before leaving for work.

Figure 3:
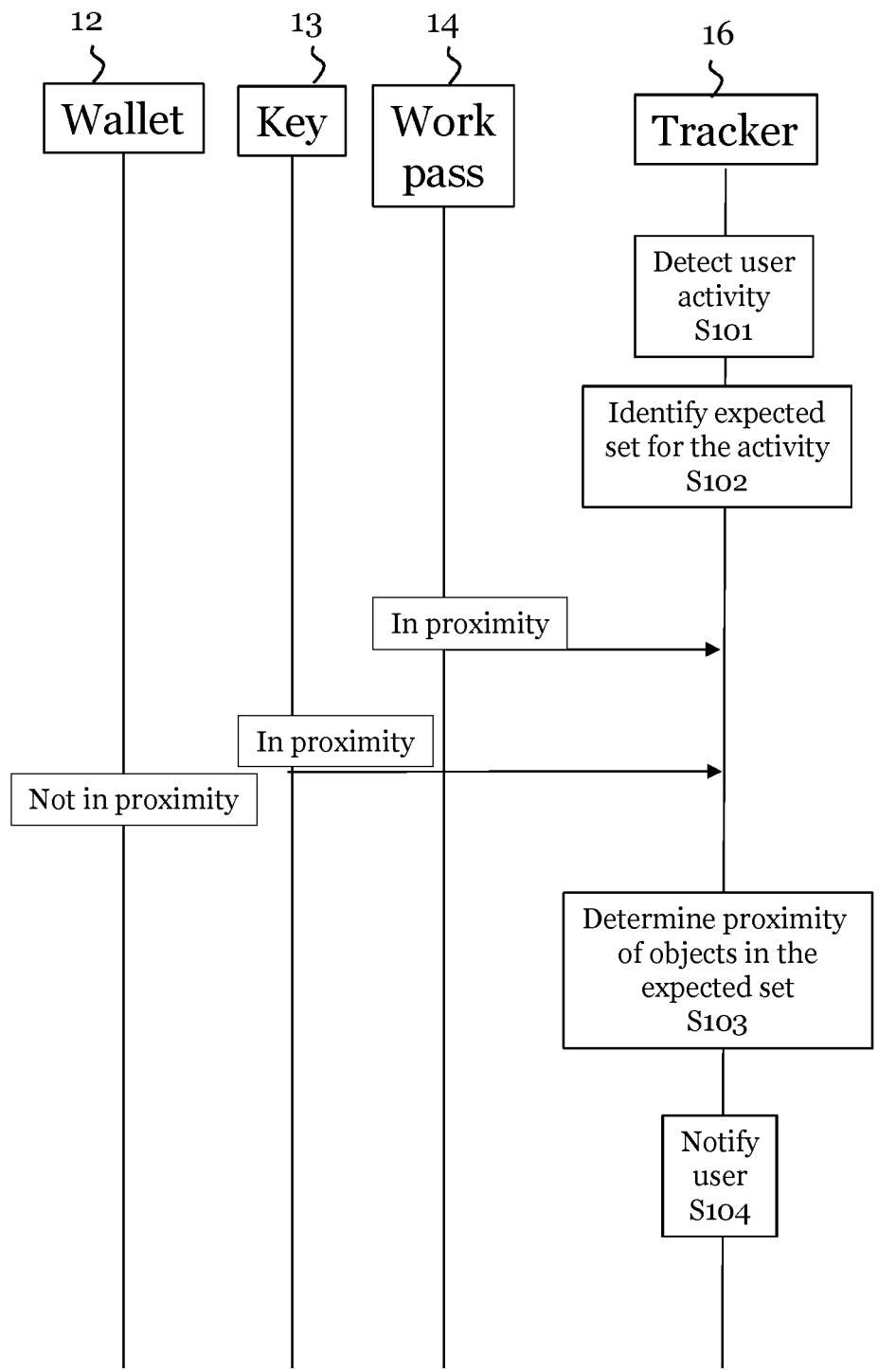
FIG. 3 shows a sequence diagram illustrating the embodiment of the method of monitoring objects capable of wireless communications according to FIG. 2, performed by the wireless communications device of the user.

FIG. 3 illustrates a sequence diagram where the method of monitoring is performed in its entirety by the tracker device 16 according to an embodiment of the invention.

The tracker device 16 has access to one or more specified activities of the user 10, for instance fetched from a calendar app executing on the user's smartphone (exemplified here as being the tracker device 16). An alternative approach is to have the tracker device 16 learn activities of the user, and even to associate a learned expected set of objects with each learned activity.

For instance, after the tracker device 16 has (1) left the home premises on (2) a weekday at (3) 07:00-08:00 at a number of occasions, it will define the activity "Go To Work" based on these three criteria. Further, by repeatedly detecting a set of objects in its proximity at these occasions, the tracker device 16 will form the expected set of objects and associate the expected set with this activity.

Hence, a database may be maintained at the tracker device 16 specifying a number of activities and an expected set of objects associated with each of the activities:

TABLE 1a

Database comprising activities and associated objects.

| Activity | Expected set of objects |
|---|---|
| Activity1 | Object1, Object2, Object3 |
| Activity2 | Object1, Object4 |
| Activity3 | Object5 |

As can be seen in Table 1a, at least one object is associated with each activity, thereby creating the expected set of objects. One and the same object may be associated with different activities. In the example Table, Object1 is comprised in the expected set both for Activity1 and Activity2.

In this particular exemplifying embodiment, the tracker device 16 detects in step S101 its location, e.g., using GPS, or by detecting that it leaves a coverage area of the user's WLAN. If the location of the tracker device 16 changes from a first location ("on home premises") to a second location ("off home premises") on any weekday at 07:00-08:00, the user is considered to partake in this particular activity ("Go To Work"). It is assumed that this corresponds to Activity1 in Table 1a.

Thereafter, in step S102, the tracker device 16 acquires information identifying an expected set of objects which are associated with the detected activity from the stored database. To this end, the tracker device 16 maps the detected activity ("Activity1") to the entries in Table 1a and concludes that the expected set 15 comprises Object1, Object2, and Object3, in this example corresponding to the wallet 12, the home key 13, and the work pass 14, respectively.

Further, the tracker device 16 determines in step S103 whether at least one of the objects 12, 13, 14 in the expected set is not in its proximity, upon the user performing the activity of going to work ("Activity1"). It is in this example assumed that the tracker device 16 communicates with the objects utilizing NFC.

As is illustrated in FIG. 3, the tracker device 16 determines whether the objects 12, 13, 14 are in its proximity, for instance by making an attempt to communicate with the objects, or by measuring the strength of a respective signal received from the objects. If the communication attempt is successful, or if the signal strength exceeds a threshold value, the object is considered to be in proximity of the tracker device 16. Optionally, and indicator indicating "proximity" for each object can be stored in the database, e.g., in the form of a signal strength threshold defining "proximity" for that specific object.

In this particular example, the home key 13 and the work pass 14 are in proximity to the tracker device 16, while the wallet 12 is not.

The tracker device 16 determines in step S103 that the home key 13 ("Object2") and the work pass 14 ("Object3") are in proximity to the tracker device 16, but that the wallet 12 ("Object1") is not, thereby concluding from Table 1a that not all the objects in the expected set for Activity1 are in proximity to the tracker device 16.

As a consequence, the tracker device 16 notifies the user 10 in step S104 by emitting an audio alert to the user 10, informing her about the lacking wallet 12. As an alternative, or in addition, to emitting an audio alert, the tracker device 16 may optionally display a message notifying the user that an expected object is not in the user's 10 proximity, preferably also identifying the missing object by name (e.g., "You forgot your wallet.").

Figure 4:
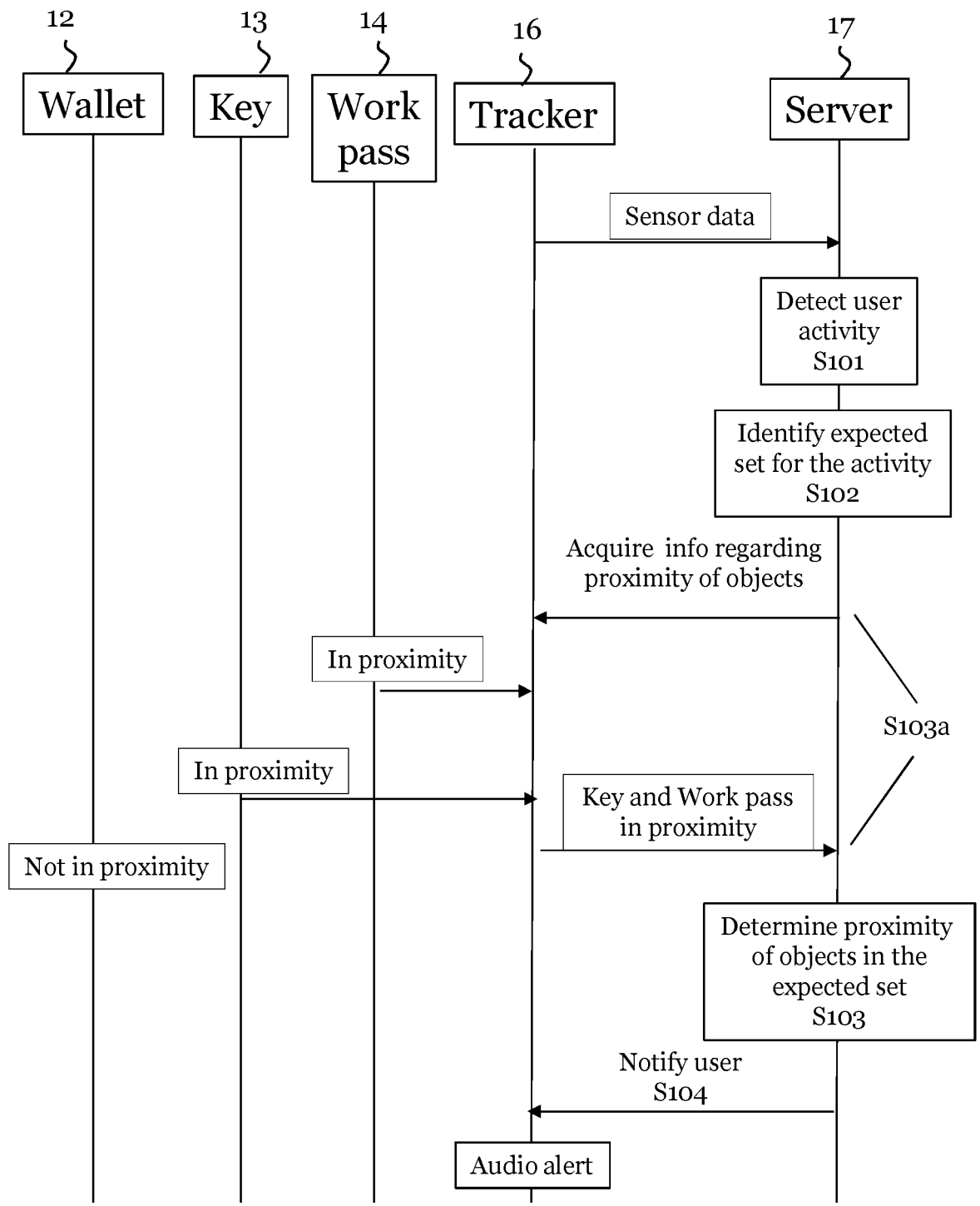
FIG. 4 shows a sequence diagram illustrating an embodiment of the method of monitoring objects capable of wireless communications, performed by a remotely located network node.

FIG. 4 illustrates a sequence diagram where the method of monitoring is performed partly or fully at one or more remotely located network nodes, thereby facilitating a cloud solution. In FIG. 4, the network node(s) is/are embodied by the server 17.

In this embodiment, the server 17 has access to one or more specified activities of the user 10, for instance fetched from a calendar app executing on the user's smartphone (exemplified as being the tracker device 16) or from a cloud storage. In addition, sensor readings such as position or location data may be transmitted from the tracker device 16 to the server 17.

To this end, a database may be maintained at the server 17 specifying a number of activities and an expected set of objects associated with each of the activities, as previously described with reference to Table 1a.

In this particular exemplifying embodiment, the server 17 detects in step S101 the location of the tracker device 16 using GPS. If the tracker device 16 is leaving the user's 10 home premises 11 on any weekday at 07:00-08:00, the activity ("Go To Work") is detected. Again, it is assumed that this corresponds to Activity1 in Table 1a.

Thereafter, in step S102, the server 17 acquires information identifying an expected set of objects which are associated with the detected activity, from the stored database. To this end, the server 17 maps the detected activity ("Activity1") to the entries in Table 1a and concludes that the expected set 15 comprises Object1, Object2 and Object3, in this example corresponding to the wallet 12, the home key 13, and the work pass 14, respectively.

Even though it may be envisaged that the server 17 communicates directly with the objects capable of wireless communication, i.e., the wallet 12, the home key 13 and the work pass 14, for determining their proximity to the tracker device 16 based on, e.g., GPS readings, it is in this example assumed that the tracker device 16 communicates with the respective object utilizing, e.g., NFC, and provides resulting information to the server 17. In case the server 17 would communicate directly with the objects 12, 13, 14, the method may be undertaken in its entirety "in the cloud", either by the server 17 solely or in cooperation with other remote nodes.

Hence, the server 17 acquires in step S103*a* information as to which objects actually are in proximity to the tracker device 16 upon the user performing the activity of going to work ("Activity1").

As is illustrated in FIG. 4, the tracker device 16 concludes that the home key 13 and the work pass 14 are in proximity to the tracker device 16, but that the wallet 12 is not, which the tracker device 16 reports accordingly to the server 17.

The server 17 determines in step S103 that the home key 13 ("Object2") and the work pass 14 ("Object3") are in proximity to the tracker device 16, but that the wallet 12 ("Object1") is not, thereby concluding from Table 1a that not all the objects in the expected set for Activity1 are in proximity to the tracker device 16.

As a consequence, the server 17 sends a notification to the user 10 via the tracker device 16 in step S104, whereby the tracker device 16 emits an audio alert to the user 10 advantageously informing her about her lacking wallet 12.

Again, as previously discussed, in case the server 17 would communicate directly with the objects 12, 13, 14, and notify the user 10 via, e.g., her smartwatch (not shown), the tracker device 16 need not take any active part in the monitoring, not even causing an audio alert.

Figure 5:
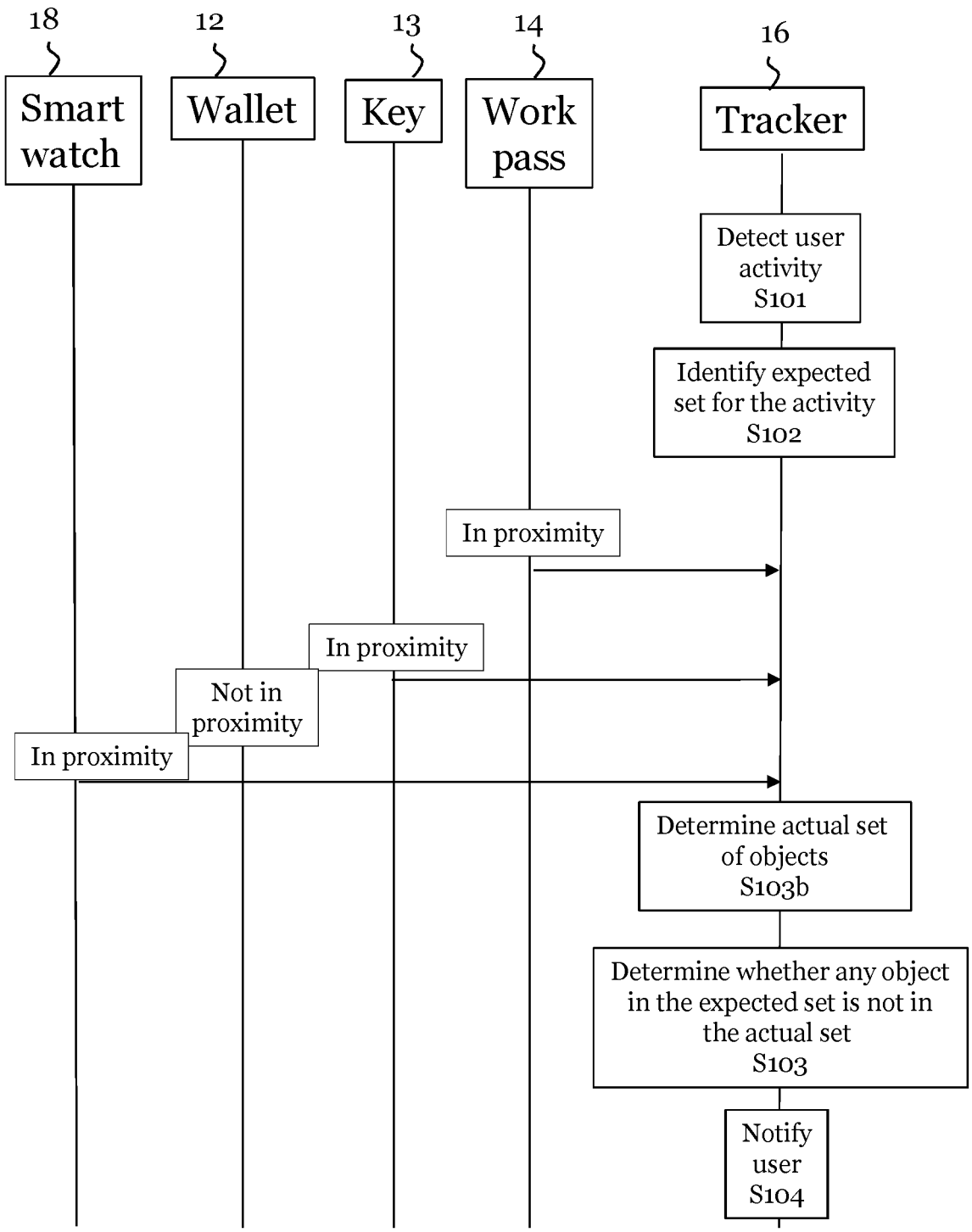
FIG. 5 shows a sequence diagram illustrating another embodiment of the method of monitoring objects capable of wireless communications.

FIG. 5 illustrates a sequence diagram where the method of monitoring is performed in its entirety by the tracker device 16 according to another embodiment. However, it is noted that this embodiment may also be implemented by a remotely located network node, such as the server 17.

In this embodiment, all objects which are in proximity to the tracker device 16 are determined upon detecting that the user 10 partakes in a specified activity. In the previously described embodiments of FIGS. 2-4, only the objects comprised in the expected set are detected as being in proximity to the tracker device 16. Accordingly, as soon as all objects 12, 13, 14 of the expected set have been detected, there is no need to continue and detect any further proximate objects.

The objects determined to be in proximity to the tracker device 16 are referred to as an actual set of objects.

As in the previous embodiment, the tracker device 16 detects in step S101 its location, e.g., using GPS. If the tracker device 16 is leaving the user's 10 home premises 11 on any weekday at 07:00-08:00, the user is considered to partake in the activity ("Go To Work"). It is assumed that this corresponds to Activity1 in Table 1a.

Thereafter, in step S102, the tracker device 16 acquires information identifying an expected set of objects which are associated with the detected activity from the stored database. To this end, the tracker device 16 maps the detected activity ("Activity1") to the entries in Table 1a and concludes that the expected set 15 comprises Object1, Object2 and Object3, in this example corresponding to the wallet 12, the home key 13, and the work pass 14, respectively.

Further, the tracker device 16 determines in step S103*b* the actual set of objects being in proximity of the tracker device 16. As is illustrated in FIG. 5, the tracker device 16 determines that the home key 13 and the work pass 14 are in proximity to the tracker device 16, but that the wallet 12 is not.

In this embodiment, the tracker device 16 further determines that a smartwatch 18 ("Object4") is in proximity of the tracker device 16, for instance by signalling based on Bluetooth or even via a Wireless Local Area Network (WLAN), commonly referred to as "WiFi".

The objects determined to be in the actual set in step S103*b* are thus the home key 13, the work pass 14, and the smartwatch 18, i.e., Object2, Object3, and Object4.

Next, in step S103, the tracker device 16 determines whether any object in the expected set is not in the actual set. With reference to Table 1a, the wallet 12 ("Object1") is not in the actual set and thus not in proximity to the tracker device 16, upon the user performing the activity of going to work ("Activity1").

As a consequence, the tracker device 16 notifies the user 10 in step S104 by emitting an audio alert and/or displaying a notification to the user 10, advantageously informing her about the lacking wallet 12.

Figure 6:
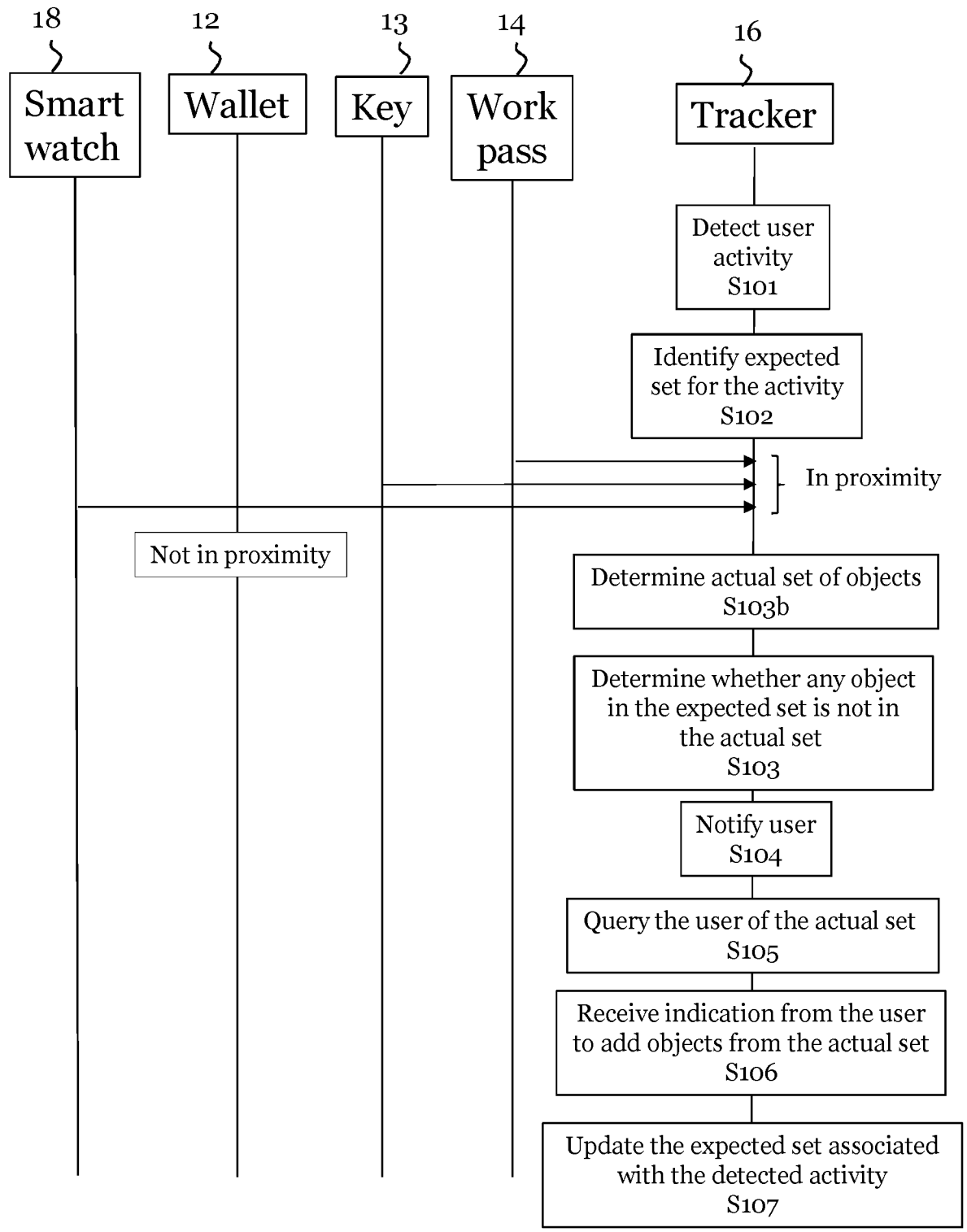
FIG. 6 shows a sequence diagram illustrating yet another embodiment of the method of monitoring objects capable of wireless communications.

FIG. 6 illustrates a sequence diagram where the method of monitoring is performed in its entirety by the tracker device 16 according to still another embodiment. However, it is noted that this embodiment may also be implemented at a remotely located network node, such as the server 17.

As in the embodiment of FIG. 5, all objects being in proximity to the tracker device 16 upon detection of the user 10 performing a specified activity are determined, thereby forming an actual set.

However, in addition to the steps of the embodiment described with reference to FIG. 5, after (or before) having notified the user 10 in step S104 that the wallet 12 included in the expected set has not been detected as being in proximity to the tracker device 16, the user is queried in step S105 as to whether any objects of the determined actual set are to be added to the expected set which is associated with the detected activity.

The user responds in step S106, in this particular example with the response that the smartwatch 18 is to be added to the expected set for Activity1.

The tracker device 16 will thus update its database of Table 1a in step S107, resulting in updated Table 1b:

TABLE 1b

Updated database comprising activities and associated objects.

| Activity | Expected set of objects |
|---|---|
| Activity1 | Object1, Object2, Object3, Object 4 |
| Activity2 | Object1, Object4 |
| Activity3 | Object5 |

Figure 7:
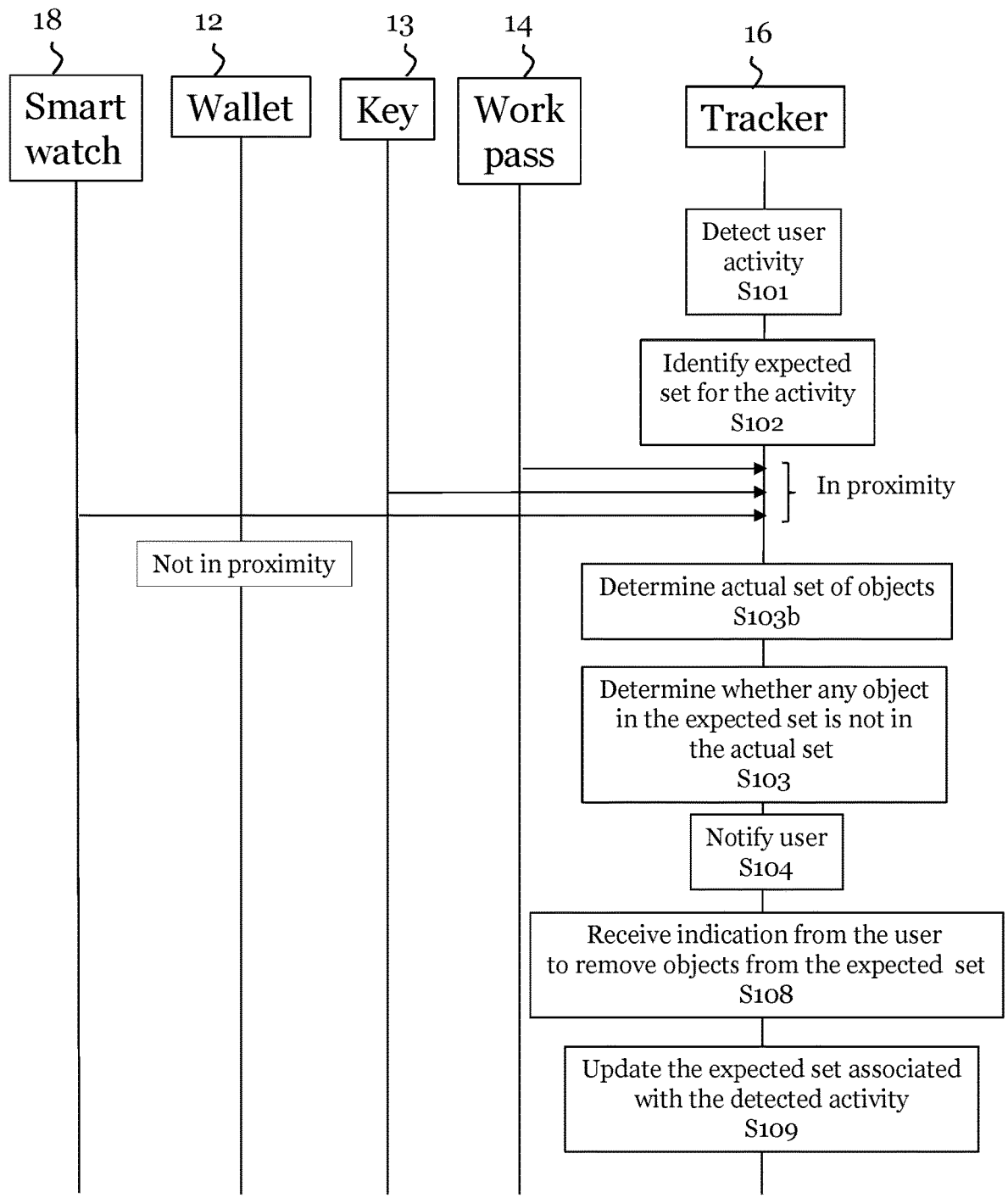
FIG. 7 shows a sequence diagram illustrating still another embodiment of the method of monitoring objects capable of wireless communications.

FIG. 7 illustrates a sequence diagram where the method of monitoring is performed in its entirety by the tracker device 16 according to still a further embodiment. However, it is noted that this embodiment may also be implemented at a remotely located network node, such as the server 17.

As in the embodiment of FIG. 5, all objects being in proximity to the tracker device 16 upon detection of the user 10 performing a specified activity are determined, thereby forming an actual set. It is noted that in this embodiment, it is not necessary to determine an actual set. Rather, steps S108 and S109 as will be described in the following may follow on step s104 in either of the embodiments in FIGS. 3 and 4.

Now, in addition to the steps of the embodiment of FIG. 5, after having notified the user 10 in step S104 that the wallet 12 included in the expected set has not been detected as being in proximity to the tracker device 16, the user 10 is given the opportunity in step S108 to indicate as to whether one or more objects of the expected set associated with the detected activity are to be removed from the expected set to create an updated expected set for the detected activity.

In this example, the user 10 indicates that the wallet 12 ("Object1") is to be removed from the expected set illustrated in Table 1a, wherein the tracker device 16 updates its database of Table 1a in step S109, resulting in updated Table 1c:

TABLE 1c

Updated database comprising activities and associated objects.

| Activity | Expected set of objects |
| --- | --- |
| Activity1 | Object2, Object3 |
| Activity2 | Object1, Object4 |
| Activity3 | Object5 |

It is noted that the embodiments described in FIGS. 6 and 7 may be combined. That is, the user may add objects of the determined actual set, as well as remove objects from the expected set, wherein the tracker device 16 will update its database accordingly, as has been described.

Figure 8:
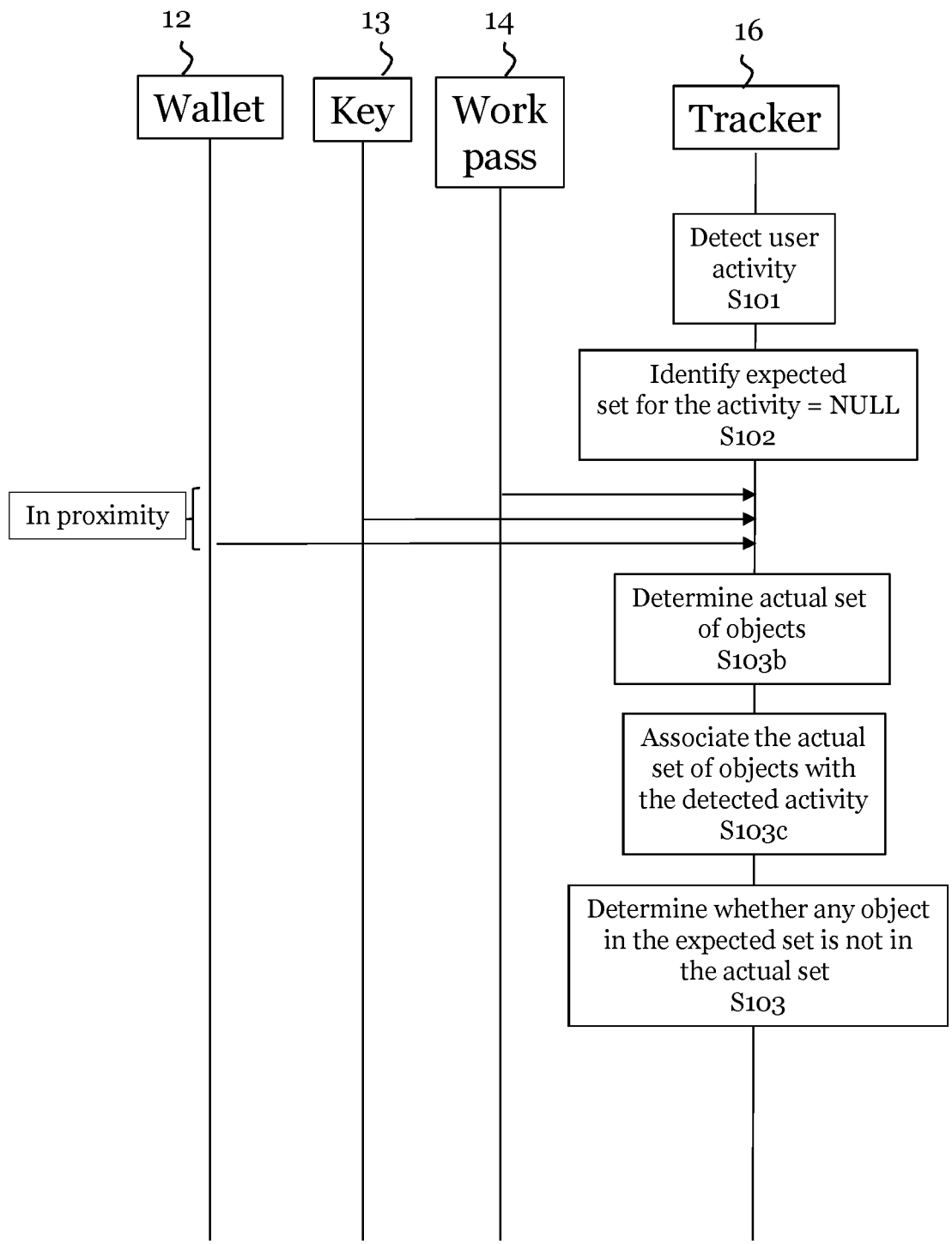
FIG. 8 shows a sequence diagram illustrating still a further embodiment of the method of monitoring objects capable of wireless communications.

FIG. 8 illustrates a sequence diagram where the method of monitoring is performed in its entirety by the tracker device 16 according to yet another embodiment. However, it is noted that this embodiment may also be implemented at a remotely located network node, such as the server 17.

As in the embodiments of FIGS. 5-7, all objects being in proximity to the tracker device 16 upon detection of the user 10 performing a specified activity is determined, thereby forming an actual set.

This embodiment is advantageous since it facilitates machine learning, as will be described in detail in the following.

Assuming for instance the scenario of Table 2a in the below:

TABLE 2a

Database comprising activities and associated objects.

| Activity | Expected set of objects |
| --- | --- |
| Activity1 | — |
| Activity2 | Object1, Object4 |
| Activity3 | Object5 |

In this exemplifying embodiment, the tracker device 16 again has access to one or more specified activities of the user 10, for instance fetched from a calendar app executing on the user's smartphone (exemplified here as being the tracker device 16), or learned by means of machine learning as previously discussed.

However, in this embodiment, no expected set of objects has yet been recorded and associated with newly learned Activity1 ("Go To Work"), which may be learned by the tracker device 16 detecting that it leaves the home premises between 7 and 8 AM on a weekday at a number of occasions.

Again, the tracker device 16 detects in step S101 its location using, e.g., GPS. If the tracker device 16 is leaving the user's 10 home premises 11 on any weekday at 07:00-08:00, the user is considered to partake in new Activity1, which is learned by the tracker device 16 and added to Table 2a.

Thereafter, in step S102, the tracker device 16 acquires information identifying an expected set of objects which are associated with the detected activity from the stored database. To this end, the tracker device 16 maps the detected activity ("Activity1") to the entries in Table 2a and concludes that expected set associated with Activity1 not yet comprises any objects.

Further, the tracker device 16 determines in step S103b the actual set of objects being in proximity of the tracker device 16. As is illustrated in FIG. 8, the tracker device 16 concludes that the wallet 12, the home key 13, and the work pass 14, are in proximity to the tracker device 16.

Now, in step S103c, the tracker device 16 advantageously associates the actual set of objects 12, 13, 14 with the detected activity as a new expected set of objects, and thus updates Table 2a, resulting in Table 2b:

TABLE 2b

Updated database comprising activities and associated objects.

| Activity | Expected set of objects |
| --- | --- |
| Activity1 | Object1, Object2, Object3 |
| Activity2 | Object1, Object4 |
| Activity3 | Object5 |

Advantageously, with this embodiment, machine learning can be applied to record activities and objects in the database as illustrated in Tables 2a and b, and to create appropriate associations between expected sets and corresponding activities.

In an embodiment, machine learning such as association rule mining and/or frequent itemsets (discussed, e.g., in Chapter 6 of "Mining of Massive Datasets" by J. Leskovec, A. Rajaraman, and J. D. Ullman), is used to deduce an expected set of devices to be associated with a particular activity.

For instance, a trackder device 16 such as a mobile phone or smartphone of a user, possibly in combination with further sensing devices, is used for building a database of activities and corresponding expected sets of devices to be associated with the activities.

In the present example, the tracker device 16 registers that when the user leaves at home during a weekday at 07:00-08:00, she usually brings her wallet 12, home key 13, and work pass 14. Upon having registered that (1) The user leaves at home during a weekday at 07:00-08:00, and that (2) The user usually brings her wallet, home key and work pass at these occasions, at repeated occasions—such as at five different occasion—the tracker device 16 (or some other node such as the server 17 and/or a cloud service), may conclude that (1) The user leaving home during a weekday at 07:00-08:00 is a commonly or routinely performed activity, which is registered as an activity "Go To Work" (possibly giving the user a chance the name/define the activity), and that (2) The user usually brings her wallet, home key, and work pass, upon performing this activity. Thus, the wallet, home key, and work pass, are registered as an expected set of devices to be associated with the activity "Go To Work".

When deducing the expected set, the tracker device 16 may for instance stipulate that any object to be included in the expected set must fulfill a certain probability threshold, such as having been carried by the user at 80% of the occasions when the user performed the activity.

Hence, a behaviour ("leave home on a weekday at 07:00-08:00") of the user is registered, and if it is concluded that the registered behaviour is a frequently occurring behaviour of the user (e.g., having occurred more than 5 times), the registered behaviour is registered as an activity ("Go To Work").

Further, a group of objects ("wallet, home key, work pass") is registered as being carried by the user when the frequently occurring behaviour ("leave home on a weekday at 07:00-08:00") of the user is registered, the group of objects being specified as the expected set of objects associated with the specified activity ("Go To Work").

It is understood that a great number of different activities and a correspondingly great number of expected sets to be associated with the different activities may be identified by the tracker device 16 and registered in the database.

Figure 9:
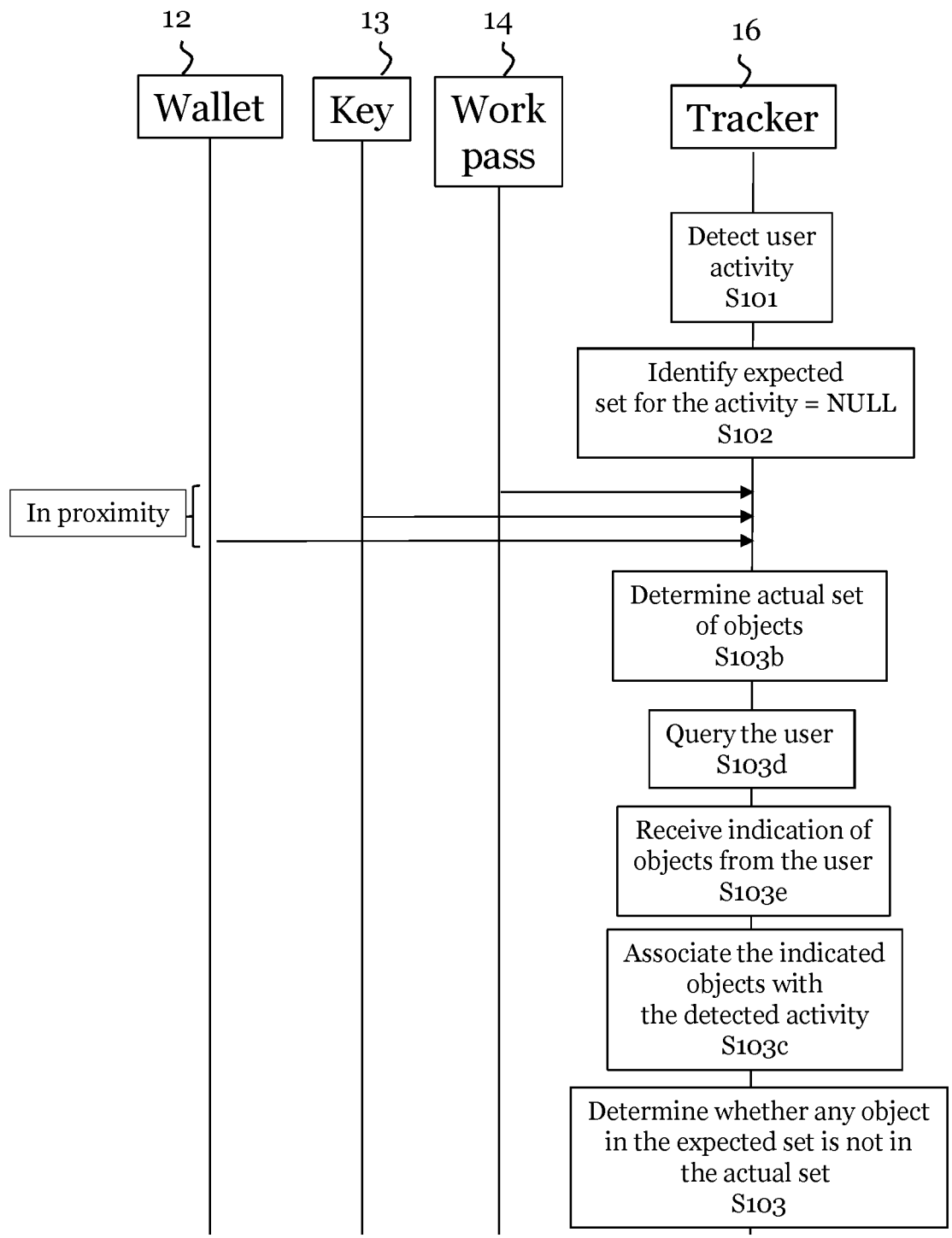
FIG. 9 shows a sequence diagram illustrating yet a further embodiment of the method of monitoring objects capable of wireless communications.

FIG. 9 illustrates a sequence diagram where the method of monitoring is performed in its entirety by the tracker device 16 according to still another embodiment.

However, it is noted that this embodiment may also be implemented at a remotely located network node, such as the server 17.

As in the embodiments of FIGS. 5-8, all objects being in proximity to the tracker device 16 are detected upon detection of the user 10 performing a specified activity, thereby forming an actual set.

However, in addition to the steps of the embodiment of FIG. 6, after having determined the actual set of objects 12, 13, 14 in step S103*b*, the tracker device 16 queries the user 10 in step S103*d* whether the objects 12, 13, 14 of the determined actual of objects are to be stored as a new expected set for the detected activity.

The user 10 responds to the query in step S103*e*, for instance by indicating on a screen of the tracker device 16 (being, e.g., a smartphone) whether all determined objects of the actual set are to be associated with the detected activity as the new expected set, or whether a subset of the objects of the actual set is to be associated with the detected activity as the new expected set, in response to which the tracker device 16 advantageously associates the objects 12, 13, 14 indicated by the user 10 with the detected activity as the new expected set of objects, and thus updates Table 2a, resulting in Table 2b.

The invention has mainly been described above with reference to a few embodiments. However, a number of scenarios may be envisaged, where a common feature is that a user is automatically notified of the device(s) she needs at different activities in different times and situations.

1. A doctor is called upon to deal with an activity in the form of an emergency situation where a patient experiences high blood sugar (hyperglycaemia). The expected set associated with this activity may thus comprise (a) a dose of insulin and (b) an injection device (e.g., being RFID-tagged). If the doctor has forgotten to pack the insulin and injection upon leaving his clinic, his mobile phone detects the absence and raises an alarm, so that the doctor realizes this before he leaves his clinic.

2. When going to court, a lawyer is expected to bring an important case file. The case file may be RFID-tagged to ensure that his smartwatch will sound an alarm if he leaves his office for the court proceedings without the case file.

3. A mother wants to go out with her family for a picnic. She wants to ensure that she carries the high resolution handy-cam to capture the beautiful moments during their time out. In case of bad weather, she will also want to bring a garden umbrella. The activity may thus specify a date and time of the picnic, and further weather conditions acquired for instance from a weather forecast. Hence, if she leaves home at the specified date and time, and the forecast predicts bad weather, her smartphone will notify her if she does not bring the handy-cam and/or the umbrella.

4. It is detected that the user arrives at home, and the actual set of objects is detected. Typically, this is the same set of objects as the set of objects which the user carried when leaving home. If an object is missing, the user may be notified that she has forgotten an object, or that an object has been stolen.

Even further, the activity which is performed by the user of the wireless communications device may be detected based on at least one, a combination, or a pattern, of: a location of the wireless communications device or a change thereof, a motion pattern of the wireless communications device or a change thereof, a date, a time of day, a calendar event, a communication event, or even current weather conditions. To this end, the behaviour and movements of the user, for instance the user leaving her home or her office, or whether the user is out running and suddenly stops (or starts) running, time windows, such as a particular time of the day, or a particular weekday derived for instance from a meeting event or itinerary information in a digital calendar, or even sensor information, where for instance the user's smartwatch alerts the user in case skin temperature measured by an IoT-type temperatures arranged in a garment of the user exceeds a threshold value, the activity being defined e.g. as "User Catching Fever".

Figure 10:
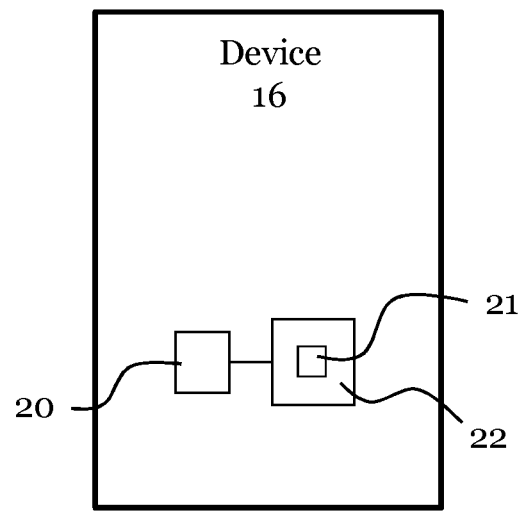
FIG. 10 shows a device for monitoring objects capable of wireless communications, in accordance with an embodiment of the invention.

With reference to FIG. 10, the steps of the method performed by the tracker device 16, or the server 17, or a distributed cloud solution, according to embodiments are in practice performed by a processing unit 20 embodied in the form of one or more microprocessors arranged to execute a computer program 21 downloaded to a suitable storage medium 22 associated with the microprocessor, such as a Random Access Memory (RAM), a Flash memory or a hard disk drive. The processing unit 20 is arranged to cause the device 16 to carry out the method according to embodiments when the appropriate computer program 31 comprising computer-executable instructions is downloaded to the storage medium 32 and executed by the processing unit 30. The storage medium 32 may also be a computer program product comprising the computer program 31. Alternatively, the computer program 31 may be transferred to the storage medium 32 by means of a suitable computer program product, such as a Digital Versatile Disc (DVD) or a memory stick. As a further alternative, the computer program 31 may be downloaded to the storage medium 32 over a network. The processing unit 30 may alternatively be embodied in the form of a digital signal processor (DSP), an application specific integrated circuit (ASIC), a field-programmable gate array (FPGA), a complex programmable logic device (CPLD), etc.

Figure 11:
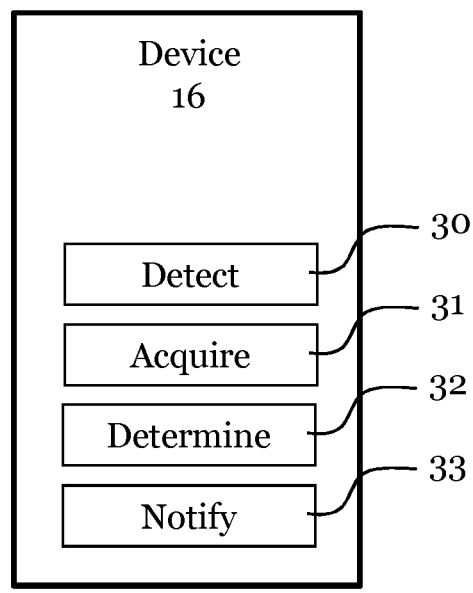
FIG. 11 shows a device configured to monitor objects capable of wireless communications, in accordance with another embodiment of the invention.

FIG. 11 illustrates a device 16 configured to monitor objects capable of wireless communication. The device 16 comprises detecting means 30 adapted to detect an activity performed by a user of a wireless communications device, acquiring means 31 adapted to acquire information identifying an expected set of objects which are associated with the detected activity, and determining means 32 adapted to determine whether at least one of the objects in the expected set is not in proximity of the wireless communications device. Further, the device 16 comprises notifying means 33 adapted to notify the user that at least one of the objects in the expected set is not in proximity of the wireless communications device The device 16 may further comprise a communications interface for receiving and providing information, and further a local storage for storing data, and may (in analogy with that previously discussed) be implemented by a processor embodied in the form of one or more microprocessors arranged to execute a computer program downloaded to a suitable storage medium associated with the microprocessor, such as a RAM, a Flash memory or a hard disk drive.

As is readily appreciated by a person skilled in the art, other embodiments than the ones disclosed above are equally possible within the scope of the invention, as defined by the appended patent claims.

The invention claimed is:

1. A method by a wireless communications device carried by a user for monitoring objects capable of wireless communications, the method comprising:
   detecting an activity sensed as a change in location from a first geographic location to a second geographic location spaced apart from the first geographic location of the wireless communications device carried by the user;
   acquiring information identifying an expected set of objects which are associated with the detected activity;
   responsive to the detection of the activity, determining based on sensing short-range radio signalling from proximately located objects and comparison of object identities obtained from the sensed short-range radio signaling to the objects in the expected set, whether at least one of the objects in the expected set is not in proximity of the wireless communications device; and
   based on the determination indicating that one of the objects in the expected set is not in the proximity of the wireless communications device, notifying the user that at least one of the objects in the expected set is not in proximity of the wireless communications device.

2. The method according to claim 1, further comprising:
   determining an actual set of objects which are in proximity of the wireless communications device, wherein the determining whether at least one of the objects in the expected set is not in proximity of the wireless communications device comprises:
   determining whether at least one of the objects in the expected set is not in the actual set.

3. The method according to claim 2, further comprising:
   querying the user whether any objects of the determined actual set of objects are to be added to the expected set of objects for the detected activity;
   receiving from the user, in response to the query, an indication from the user regarding which objects of the determined actual set are to be included in the expected set; and
   updating the expected set of objects associated with the detected activity to further include the user-indicated objects of the determined actual set.

4. The method according to claim 2, further comprising:
   storing the determined actual set of objects as a new expected set associated with the detected activity, if information identifying an expected set of objects is not available.

5. The method according to claim 4, further comprising:
   querying the user whether the objects of the determined actual set of objects are to be stored as the new expected set of objects for the detected activity; and
   receiving from the user, in response to the query, an indication from the user regarding which objects of the determined actual set are to be included in the new expected set, wherein the step of storing the determined actual set of objects as a new expected set associated with the detected activity comprises:
   storing the user-indicated objects of the determined actual set as the new expected set associated with the detected activity.

6. The method according to claim 1, further comprising:
   receiving from the user, in response to notifying the user that at least one of the objects in the expected set is not in proximity of the wireless communications device, an indication that one or more objects in the expected set should be removed from the expected set for the detected activity; and
   updating the expected set of objects associated with the detected activity to remove the user-indicated objects from the expected set which is associated with the detected activity.

7. The method according to claim 1, wherein the activity which is performed by the user of the wireless communications device is detected based on at least one, a combination, or a pattern, of: a location of the wireless communications device or a change thereof, a motion pattern of the wireless communications device or a change thereof, and current weather conditions.

8. The method according to claim 1, wherein:
   a behaviour of the user is registered; and
   a group of objects are registered as being carried by the user in response to determining a frequently occurring behaviour of the user is registered, the group of objects being specified as the expected set of objects associated with an activity sensed as a change in location of the wireless communications device carried by the user.

9. The method according to claim 1, wherein the user is notified by at least one of: emitting an audible sound, displaying a message, generating a haptic notification, and triggering another wireless communications device to notify the user.

10. The method according to claim 1, wherein the information identifying the expected set of objects is retrieved from a database.

11. The method according to claim 1, wherein a plurality of sets of objects are associated with the user, and the acquiring information comprises selecting the expected set of objects from among the sets of objects associated with the user based on occurrence of a calendar event which is associated with the expected set of objects in a calendar application executed by the wireless communications device.

12. The method according to claim 1, wherein a defined one of the objects is associated with a defined weather condition, and the acquiring information comprises obtaining a weather forecast and to include the defined one of the objects in the expected set of objects responsive to the defined weather condition being satisfied by the weather forecast.

13. The method according to claim 12, further comprising:
   acquiring, from the wireless communications device, information regarding which objects are in proximity of the wireless communications device.

14. A wireless communications device carried by a user for monitoring objects capable of wireless communications, the device comprising:
   a communication interface configured to sense short-range radio signaling from proximately located objects;
   a processor connected to the communication interface; and
   a memory containing instructions executable by the processor to perform operations to:
   detect an activity sensed as a change in location from a first geographic location to a second geographic location spaced apart from the first geographic location of the wireless communications device carried by the user;

acquire information identifying an expected set of objects which are associated with the detected activity;

responsive to the detection of the activity, determine whether at least one of the objects in the expected set is not in proximity of the wireless communications device based on comparison of object identities obtained from the sensed short-range radio signaling from the proximately located objects to the objects in the expected set; and based on the determination indicating that one of the objects in the expected set is not in the proximity of the wireless communications device, notify the user that at least one of the objects in the expected set is not in proximity of the wireless communications device.

15. The wireless communications device according to claim 14, being further operative to:

determine an actual set of objects which are in proximity of the wireless communications device; and further to, when determining whether at least one of the objects in the expected set is not in proximity of the wireless communications device:

determine whether at least one of the objects in the expected set is not in the actual set.

16. The wireless communications device according to claim 15, being further operative to:

query the user whether any objects of the determined actual set of objects are to be added to the expected set of objects for the detected activity;

receive from the user, in response to the query, an indication from the user regarding which objects of the determined actual set are to be included in the expected set; and update the expected set of objects associated with the detected activity to further include the user-indicated objects of the determined actual set.

17. The wireless communications device according to claim 15, being further operative to:

store the determined actual set of objects as a new expected set associated with the detected activity, if information identifying an expected set of objects is not available.

18. The wireless communications device according to claim 17, being further operative to:

query the user whether the objects of the determined actual set of objects are to be stored as the new expected set of objects for the detected activity; and receive from the user, in response to the query, an indication from the user regarding which objects of the determined actual set are to be included in the new expected set; and being further operative, when storing the determined actual set of objects as a new expected set associated with the detected activity, to:

store the user-indicated objects of the determined actual set as the new expected set associated with the detected activity.

19. The wireless communications device according to claim 14, being further operative to:

receive from the user, in response to notifying the user that at least one of the objects in the expected set is not in proximity of the wireless communications device, an indication that one or more objects in the expected set should be removed from the expected set for the detected activity; and update the expected set of objects associated with the detected activity to remove the user-indicated objects from the expected set which is associated with the detected activity.

20. The wireless communications device according to claim 14, wherein a plurality of sets of objects are associated with the user, and the wireless communications device is further operative when acquiring the information to select the expected set of objects from among the sets of objects associated with the user based on occurrence of a calendar event which is associated with the expected set of objects in a calendar application executed by the wireless communications device.

21. The wireless communications device according to claim 14, wherein a defined one of the objects is associated with a defined weather condition, and the wireless communications device is further operative when acquiring the information to obtain a weather forecast and to include the defined one of the objects in the expected set of objects responsive to the defined weather condition being satisfied by the weather forecast.

22. The method of claim 1, wherein the expected set of objects is determined based on a location of the wireless communications device or a change thereof.

23. The method of claim 1, wherein the expected set of objects is determined based on a motion pattern of the wireless communications device or a change thereof.

24. The method of claim 1, wherein the expected set of objects is determined based on current weather conditions.

* * * * *

UNITED STATES PATENT AND TRADEMARK OFFICE
CERTIFICATE OF CORRECTION

PATENT NO. : 11,595,784 B2
APPLICATION NO. : 16/310872
DATED : February 28, 2023
INVENTOR(S) : Mohalik et al.

It is certified that error appears in the above-identified patent and that said Letters Patent is hereby corrected as shown below:

In the Specification

In Column 5-6, Lines 67 & 1, delete "detection" and insert -- detecting --, therefor.

In Column 8, Line 3, delete "and" and insert -- an --, therefor.

In Column 10, Line 56, delete "s104" and insert -- S104 --, therefor.

In Column 12, Line 31, delete "trackder" and insert -- tracker --, therefor.

In Column 14, Lines 31-48, delete "Access Memory (RAM), a Flash memory or a hard disk drive. The processing unit 20 is arranged to cause the device 16 to carry out the method according to embodiments when the appropriate computer program 31 comprising computer-executable instructions is downloaded to the storage medium 32 and executed by the processing unit 30. The storage medium 32 may also be a computer program product comprising the computer program 31. Alternatively, the computer program 31 may be transferred to the storage medium 32 by means of a suitable computer program product, such as a Digital Versatile Disc (DVD) or a memory stick. As a further alternative, the computer program 31 may be downloaded to the storage medium 32 over a network. The processing unit 30 may alternatively be embodied in the form of a digital signal processor (DSP), an application specific integrated circuit (ASIC), a field-programmable gate array (FPGA), a complex programmable logic device (CPLD), etc." and insert the same at Line 30, after "Random" as a continuation paragraph.

In Column 14, Line 61, delete "device" and insert -- device. --, therefor.

Signed and Sealed this
Fourteenth Day of November, 2023

Katherine Kelly Vidal
*Director of the United States Patent and Trademark Office*